United States Patent [19]
Pitzer et al.

[11] Patent Number: 6,131,617
[45] Date of Patent: Oct. 17, 2000

[54] SAFETY-ENHANCED HEAT TRACING

[75] Inventors: R. Knox Pitzer, San Marcos; David L. Schlameus, New Braunsfels; Roy E. Barth, San Marcos, all of Tex.

[73] Assignee: Thermon Manufacturing Company, San Marcos, Tex.

[21] Appl. No.: 09/301,416

[22] Filed: Apr. 28, 1999

Related U.S. Application Data
[60] Provisional application No. 60/083,320, Apr. 28, 1998.

[51] Int. Cl.⁷ ....................................................... F16L 53/00
[52] U.S. Cl. ............................... 138/143; 138/38; 138/33; 165/164
[58] Field of Search ........................ 138/38, 33; 219/494, 219/510; 338/208; 165/164

[56] References Cited

U.S. PATENT DOCUMENTS

| | | | |
|---|---|---|---|
| 3,793,716 | 2/1974 | Smith-Johannsen | 29/611 |
| 3,949,189 | 4/1976 | Bilbro et al. | 138/33 X |
| 4,575,617 | 3/1986 | Cooper | 219/494 |
| 5,086,836 | 2/1992 | Barth et al. | 165/164 |

*Primary Examiner*—Patrick Brinson
*Attorney, Agent, or Firm*—Akin, Gump, Strauss, Hauer & Feld, LLP

[57] ABSTRACT

Safety-enhanced steam tracing includes a metallic tube with a thin jacket of polymeric material, such as silicone rubber. The polymeric jacket is typically about 40 mils to about 60 mils thick. The safety-enhanced steam tracing provides a substantially lower risk of burn injury than bare metal steam tracing, yet its conductance performance is about the same as that of bare metal steam tracing.

13 Claims, 1 Drawing Sheet

FIG. 1
*(PRIOR ART)*
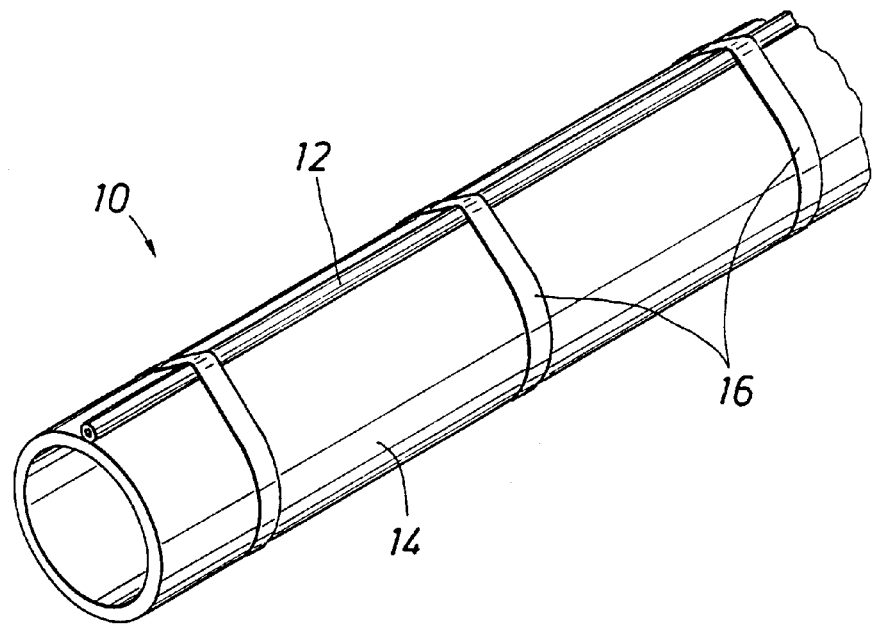
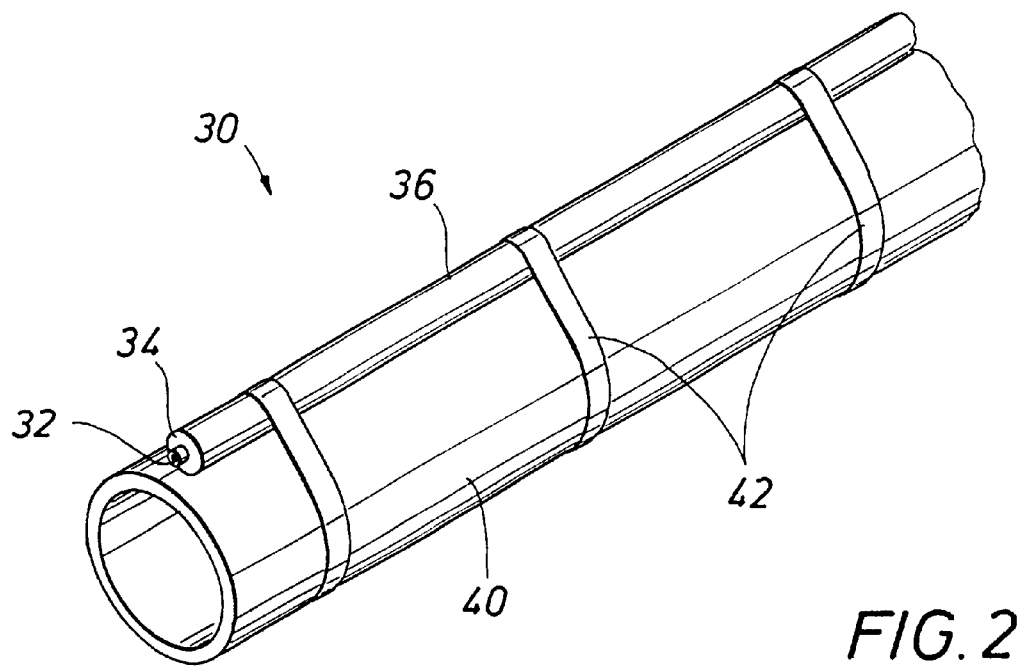
FIG. 2

SAFETY-ENHANCED HEAT TRACING

CROSS-REFERENCE TO RELATED APPLICATIONS

This application claims priority to and the benefit of U.S. Provisional Patent Application No. 60/083,320 having a filing date of Apr. 28, 1998.

STATEMENT REGARDING FEDERALLY SPONSORED RESEARCH

Not applicable.

BACKGROUND OF THE INVENTION

1. Field of the Invention

The present invention relates generally to heat transfer equipment, and more particularly to a heat-tracing apparatus.

2. Description of the Related Art

To ensure the continuity of plant operations in industries, such as refining, chemical, and pulp and paper, process and utility pipes and vessels are often heated by convection steam tracers to keep the contents of fluids such as liquids, gases, vapors, suspensions and slurries from freezing, condensing, crystallizing, separating or becoming too viscous to pump.

A standard measurement of steam tracing performance used in industry is conductance. Tracer conductance is designated $C_T$. The $C_T$ value is derived to reflect the normalized heat transfer coefficient of the heat transfer element (tracer). The coefficient is normalized in terms of a "per unit length," generally reduced to feet. The resulting $C_T$ is commonly given units of BTU/hr-ft-° F.

If $Q=U \cdot A \cdot \Delta T$, where Q=heat loss (BTU/hr), U=overall heat transfer coefficient (BTU/hr-FT$^2$-° F.), $\Delta T$=temperature gradient, and A=surface area, then for purposes of steam tracing, $U \cdot A$ is defined as the conductance of the tracer ($C_T$). This eliminates the complex variables involved in calculating $U \cdot A$ which include variables such as size of the heat transfer element (tracer), size of the process pipe, area of contact between the tracer and the pipe and several other factors. The $C_T$ value is experimentally derived by measuring Q and $\Delta T$ on a particular steam tracing system.

There are three methods of steam tracing used when steam is chosen as the tracing method of choice. A first and most prevalent steam tracing method uses bare metallic tracer tubes, and is termed "bare tracing" or "convection tracing." In convection tracing, a small diameter tube or pipe, which contains steam or a hot fluid, is externally secured with wire, banding material or high temperature tape to a process pipe, vessel, or other plant equipment for heating a process fluid therein. The steam tracer may be parallel to or spirally around the process pipe, vessel or other plant equipment to be heated. Thermal insulation is placed over the steam tracer and the process pipe or object being heated.

The steam tracer, typically copper or stainless steel tubing, relies on spot contact between the tracer line and the process pipe together with convection (thus termed "convection tracing") to the surrounding air inside the annular space between the oversized thermal insulation and the process pipe and radiation from the tracer line to the process pipe. The heat transfer conductance range for convection tracers (see Table 1) is dependent upon the method and quality of securement of the tracer to the process pipe.

A $\frac{3}{8}$-inch outside diameter (O.D.) convection tracer firmly taped or banded on 1 to 2 foot centers will exhibit a heat transfer conductance of from approximately 0.258 to approximately 0.430 BTU/hr-ft-° F. If the convection tracer and process pipe is taped or banded as described and covered with a suitable metal foil or if the tracer is covered with a rigid metal shield and secured to the pipe, it will exhibit a heat transfer conductance of from approximately 0.430 to approximately 0.603 BTU/hr-ft-° F. It is estimated that approximately 70% to 80% of all steam tracing in North America is bare convection tracing.

A second method of steam tracing is termed "conduction tracing", where the tracer line is thermally bonded to the pipe or equipment with a heat transfer material. The primary goal of conduction tracing is to provide increased heat transfer from the tracer tube to the process pipe or equipment. A conduction steam tracing method is disclosed in assignee's U.S. Pat. No. 3,949,189. It is estimated that approximately 10–20% of steam tracing is conduction tracing.

A third method of steam tracing is called "isolated tracing" and is used to provide less heat than the first and second methods discussed above. This method consists of providing a heat retardant between the steam tracer tube and the pipe or equipment to be heated. Some systems consist of small tubes, generally $\frac{1}{4}$-inch to $\frac{3}{4}$-inch, that have a factory-applied heat retardant either wrapped or extruded on the tube, generally with a high-temperature, weatherproof jacket to protect the retardant from moisture intrusion. It is estimated that approximately 1–2% of steam tracing is currently isolated tracing. An isolated (retarding) heat tracing method is disclosed in assignee's U.S. Pat No. 5,086,836.

The tracer conductance $C_T$ in conduction tracing methods is dependent in part on the geometric relationship between tracer size and process pipe size. Table 1 shows typical conductance values for convection conduction and isolated tracing systems.

TABLE 1

| | Typical Conductance Ranges of Tracers $C_T$, BTU/hr-ft-° F. | | |
|---|---|---|---|
| Tracer Size | Convection Tracer | Conduction Tracer | Isolated Tracer |
| $\frac{3}{8}$-inch | 0.258–0.603 | 0.611–8.0 | 0.025–0.500 |
| $\frac{1}{2}$-inch | 0.343–0.80 | 0.814–8.00 | 0.27–.700 |
| $\frac{3}{4}$-inch | 0.517–1.2 | 1.221–8.0 | 0.35–1.00 |

A problem with pipes or tubes carrying steam is that they can present a danger to workers who may be required to work on or around them, due to the high pressures and temperatures inherent with steam. In 1993, there were 19,142 lost time hand injuries due to contact with hot objects or substances (Bureau of Labor Statistics). In 1988, there were 20,941 work-related injuries involving disability from contact with temperature extremes ("Accident Facts" 1993 Edition). In 1986, there were 24,749 work-related injuries involving disability from contact with temperature extremes ("Accident Facts" 1990 Edition).

Workers in manufacturing suffer the greatest number of heat burn injuries, about 40 percent of the total, according to a Bureau of Labor Statistics study of over 1,300 heat burn cases filed as worker's compensation claims. More than 40 percent of the injuries were to the upper extremities. Injuries were most often caused by flame, molten metal, petroleum asphalts, steam or water, and resulted in 2nd or 3rd degree burns in over 85 percent of the cases ("Accident Facts" 1990 Edition).

Thus, work-related burn injuries are a problem in general. Burn injuries from heat tracing is a particular problem, and convection tracing, which is the majority of heat tracing, is the primary source of burns from heat tracing. However, the desirable goal of reducing burn injuries from heat tracing has been somewhat incompatible with the necessity to maintain process fluids at a desired temperature in an economical fashion.

SUMMARY OF THE INVENTION

In response to this problem, a safety-enhanced convection tracer is provided that reduces the risk of burns without substantially affecting the thermal performance that would otherwise be obtained with a conventional bare convection tracer. The safety-enhanced convection tracer includes a conduit or tube for conveying a hot heat-transfer fluid, such as steam. The tube is covered or coated with a polymeric material, which, in one embodiment, is a silicone rubber. The safety-enhanced convection tracer provides an improved measure of safety for plant personnel, yet provides comparable conductance performance to bare metal heat steam tracing.

BRIEF DESCRIPTION OF THE DRAWINGS

In order to more fully understand the drawings referred to in the detailed description of the present invention, a brief description of each drawing is presented, in which:

FIG. 1 is a perspective view of a typical prior art heat system having a bare metal steam tracer; and FIG. 2 is a perspective view of a safety-enhanced convection tracer, according to the present invention.

DETAILED DESCRIPTION OF INVENTION

With reference to FIG. 1, a typical prior art heated system 10 includes a bare convection tracer 12 mounted on a process pipe 14. Bare convection tracer 12 is typically a small diameter metallic tube or pipe containing a hot heat-transfer fluid, such as steam. Bare convection tracer 12 is secured to process pipe 14 with a high-temperature tape or banding material 16. Process pipe 14 conveys a process fluid (not shown), which is maintained within a desired temperature range by transfer of heat from tracer 12 through process pipe 14 into the process fluid.

FIG. 2 illustrates a heated system 30 according to the present invention, which includes a heat-convection tracer 32. Tracer 32 is a small diameter tube or pipe and is preferably, but not necessarily, metallic. Tracer tube 32 is externally covered or coated with a thin layer of a polymeric material 34. Polymeric material 34 is typically, but not necessarily, applied to a thickness ranging between approximately 10 mils and 100 mils, preferably between about 40 mils and about 60 mils, which is 0.040 inches and 0.060 inches, respectively.

Polymeric material 34 is preferably silicone rubber, although other polymeric materials may be satisfactory, such as polyolefins, polyurethanes, nylon, recycled plastics, mylar, Kevlar® and polycarbonates. Silicone rubber has desirable elastic properties, high temperature capability and good chemical resistance, and polymeric material 34 is typically chosen for similar characteristics. Preferably, polymeric material 34 has a yellow color, which aids in compliance with safety requirements of OSHA and ANSI standards such as ANSI Z535.1 "Safety Color Code." A safety yellow identification jacket of polymeric material 34 signifies materials inherently dangerous such as steam per ASME A13.1-1996.

Tracer 32, as covered with polymeric material 34, provides a safety-enhanced convection tracer 36, which has a lower burn risk than bare metal steam tracer 12 in FIG. 1. The safety-enhanced convection tracer 36 is secured to a process pipe 40. Safety convection tracer 36 can be secured to process pipe 40 by banding, taping, strapping, tying or adhesion as well as other suitable methods for ensuring contact between tracer 36 and pipe 40. Tracer 36 can be secured on one, two or four foot centers and is preferably taped on one (1) foot centers with a high temperature tape 42 that is compatible with the chemical, thermal and physical requirements of the tracing environment.

Steam is typically used as a heat source for convection tracers, in which case it is steam tracing, but other heat-transfer fluids can be used as well. References made herein to steam-traced process pipes include all steam traced process, utility or service piping, fittings, valves, pumps, tanks, vessels, instruments, instrument lines and any material or equipment requiring heat-convection steam tracers.

Polymeric material 34 provides a sleeve or jacket on and around heat-convection tracer 32. Safety-enhanced convection tracer 36 in FIG. 2 provides a measure of personnel burn protection without sacrificing thermal performance when compared to bare metal tube tracer 12 in FIG. 1, as described below.

Safety-enhanced convection tracer 36 significantly reduces risk of burns. When the human body comes into contact with a heated surface, heat flows from the heated surface into the skin by conduction. If the heat flux is sufficiently high or the exposure duration is sufficiently long to raise the skin temperature at the epidermis/dermis interface above its tolerance level, a burn is caused. The degree of heat transfer into the human tissue, or the degree of the burn, is a function of the heat transfer rate from the contacted surface into the tissue, the contact area, and the contact duration. The heat transfer rate is a function of the heated surface temperature and its thermal properties. That is, for a given heated surface temperature, contact area and duration, a heated surface with a higher heat capacity and a higher thermal conductivity will cause a higher heat flux flow into the tissue, and therefore result in a potentially higher degree of burn.

To protect personnel from thermal injury in industrial environments, a hot surface temperature limit of 60° C. (140° F.) has been widely accepted as a general "rule of thumb" heated surface temperature limit. However, the heated surface condition/parameters, which can result in burns, are sufficiently complex that this general rule does not always apply. American Society of Testing Materials ("ASTM") Standard C 1055-92 "Standard Guide for Heated System Surface Conditions That Produce Contact Burn Injuries" and ASTM Standard C 1057-92 "Standard Practice for Determination of Skin Contact Temperature from Heated Surfaces Using A Mathematical Model and Thermesthesiometer" provide much more definition to this subject.

ASTM Standard C 1055-92 presents the guidelines for determining the acceptable maximum exposure temperature for a particular surface, taking into account the contact time and acceptable hazard conditions. ASTM C 1057-92 provides a standard means of calculating the maximum exposure temperature to be expected (for an average subject) from contacting a hot surface at a particular temperature, taking into account the surface material properties. FIG. 1 found in ASTM C 1055-92 as well as in C. Y. Wu's paper "Material Properties Criteria for Thermal Safety" represents the maximum time—temperature threshold allowable in order to limit the injury to a first degree burn level.

1. If the heated surface temperature is below 44° C., little short-term (based on less than 6 hours of continuous exposure) burn hazard/risk exists for any heated surface.

2. If the heated surface temperature exceeds 70° C. and the heated surface has high thermal inertia (i.e. metallic surface), a high burn hazard/risk exists (reaction times in a burn event typically range from 1 second to 5 seconds).

3. If the heated surface is of low thermal inertia (i.e. a plastic or insulated surface), it is usually recommended to follow the analysis procedures outlined in ASTM 1057 to establish a resultant skin contact temperature from a "touch event" set of conditions. This analysis may be done via a computer program, which was developed by the ASTM C-16 working group member who developed this ASTM 1057.

A silicone rubber jacketed safety-enhanced convection tracer, according to the present invention, provides an improved measure of safety for plant personnel. Silicone rubber provides desirable elastic properties, high temperature capability, and chemical resistance. A safety yellow color aids in compliance with OSHA and ANSI standards such as ANSI Z535.1 "Safety Color Code".

A test was conducted using a tracer tube comprising a ⅜-inch O.D.×0.032 inch copper tube (ASTM B280). A 40–60 mil jacket of silicone rubber was selected in an attempt to balance the heat flux for personnel protection versus heat transfer for tracing service. A one-foot long section of the sample's silicone jacket 14 was removed to expose the bare copper tube 12. This would allow the steps detailed below to be performed on the same tracer tube with identical steam flow conditions.

Testing of the silicone jacketed convection tracer tube designated as BTS Type (bare tracer with safety jacket) exhibited a surface temperature of the tracer as shown in Table 2.

TABLE 2

| BTS Tracer | Steam Temp. ° F.(° C.) | Surface Temp. ° F.(° C.) | Ambient Temp. ° F.(° C.) |
|---|---|---|---|
| 1 | 260(126.7) | 226(107.8) | 74(23.3) |
| 2 | 340(171.1) | 285(140.6) | 74(23.3) |
| 3 | 298(147.8) | 258(125.6) | 104(40) |
| 4 | 406(207.8) | 344(173.3) | 104(40) |

Utilizing the ASTM 1057 standard calculation method along with the specific experimental as well as extrapolated data for the BTS steam tube designs given above, performance results are predicted as shown in Table 3.

TABLE 3

| Tube Type | Steam Temperature/ Pressure(° F./psig) | Ambient Temperature ° F.(° C.) | Contact Time (seconds) | Predicted Skin Contact Temperature ° F.(° C.) |
|---|---|---|---|---|
| Type BTS | 298/50 | 104(40) | 1 | 139.0(59.4) |
| Type BTS | 298/50 | 104(40) | 2 | 140.7(60.4) |
| Type BTS | 298/50 | 104(40) | 3 | 141.4(60.8) |
| Type BTS | 298/50 | 104(40) | 4 | 142.3(61.3) |
| Type BTS | 298/50 | 104(40) | 5 | 143.2(61.8) |
| Type BTS | 406/250 | 104(40) | 1 | 160.3(71.3) |
| Type BTS | 406/250 | 104(40) | 2 | 162.9(72.7) |
| Type BTS | 406/250 | 104(40) | 3 | 164.1(73.4) |
| Type BTS | 406/250 | 104(40) | 4 | 165.4(74.1) |
| Type BTS | 406/250 | 104(40) | 5 | 166.6(74.8) |

By comparison, the temperature of a bare (no jacket) ⅜-inch O.D. copper convection tracer provides a temperature—time relationship as shown in Table 4.

TABLE 4

| Tube Type | Steam Temperature/ Pressure(° F./psig) | Ambient Temperature ° F.(° C.) | Contact Time (seconds) | Predicted Skin Contact Temperature ° F.(° C.) |
|---|---|---|---|---|
| Bare | 298° F./50 | 104(40) | 1 | 264(129) |
| Bare | 298° F./50 | 104(40) | 2 | 272(133.4) |
| Bare | 298° F./50 | 104(40) | 3 | 276.4(135.8) |
| Bare | 298° F./50 | 104(40) | 4 | 280.2(137.9) |
| Bare | 298° F./50 | 104(40) | 5 | 280.9(138.3) |

At the 5 second reading, the bare convection tracer will precipitate a skin temperature of 280.9° F./138.3° C. as compared to 143.2° F./61.8° C. for the BTS type tracer. The BTS tracer results in a skin temperature 137.7° F./76.5° C. less than the bare tracer. The reduction in skin contact temperature is shown in Table 5. While a 10 or 20 percent reduction in skin contact temperature may be considered substantial, the reduction illustrated in Table 5 is closer to 50 percent depending on the temperature scale.

TABLE 5

| Steam Temp/ Pressure (° F./psig) | Ambient Temp. ° F. | Contact Time (sec.) | Predicted Skin Contact Temp. ° F.(° C.) | Predicted Skin Contact Temp. ° F.(° C.) | Skin Contact Temp. Reduction ° F.(° C.) | Percent Reduction |
|---|---|---|---|---|---|---|
| 298° F./50 | 104 | 1 | 264(129) | 139.0(59.4) | 125(69.6) | 47(54) |
| 298° F./50 | 104 | 2 | 272(133.4) | 140.7(60.4) | 131.3(73.0) | 48(55) |
| 298° F./50 | 104 | 3 | 276.4(135.8) | 141.4(60.8) | 135(75.0) | 49(55) |
| 298° F./50 | 104 | 4 | 280.2(137.9) | 142.3(61.3) | 137.9(76.6) | 49(56) |
| 298° F./50 | 104 | 5 | 280.9(138.3) | 143.2(61.8) | 137.7(76.5) | 49(55) |

Thus, a very significant reduction in skin contact temperature is achieved by using a safety heat-convection tracer according to the present invention instead of a bare tracer. Nonmetallic surface steam tracers when compared to the metallic equivalent thus significantly reduce the burn risk where steam tracing is touched accidentally. The BTS type tubing significantly reduces the extent of the burn risk. The level of burn injury depends on the reaction time of the individual, which varies typically from 0.3 second to 5 seconds, but may be higher in unusual circumstances. The extent of burn injury also depends on the temperature of the steam used in the tracing. Further, the yellow safety color of the BTS type tracer warns workers of a potential pressure/temperature danger.

Identical samples of the bare convection tracer and the BTS tracer were further tested to determine the overall conductance of each. The two tracers were installed parallel on an 8-inch steel pipe at 10 o'clock and 2 o'clock banded with high-temperature tape on 12-inch centers. The traced pipe was then covered with 2-inch thick fiberglass insulation. Thermocouples were placed on the steam tubes at the supply location as well as at the tracer end after exiting the pipe and insulation. All four tracer thermocouples were insulated with 1" a fiberglass blanket wrap to ensure accuracy of readings. In addition, thermocouples were located at 90° and 180° away from the tracer and at three locations along the length of the pipe, which was 100 feet long. Each tracer was operated and supplied independently with 150 psig steam and allowed to heat up to equilibrium temperature prior to the temperature data being recorded.

Surprisingly, each tracer held the pipe at approximately the same temperature of 206° F. with an average steam temperature of 358° F. and an average ambient temperature of 76° F. The stagnation method of determining conductance or temperature gradient ratio's yielded a tracer conductance of approximately 0.344 BTU/hr-ft-° F. which falls in the mid range of the conductance expected for a ⅜-inch O.D. convection tracer as shown in Table 1.

No appreciable difference in conductance performance between the two tracing configurations was observed. Every attempt was made to choose the best polymer jacket for elastic properties, chemical resistance and high temperature capability and the thicknesses were determined to balance safety and usefulness as a steam tracer, however, it was not expected that the results would provide such a contrast in skin contact temperature while providing an almost identical thermal conductance rate to a conventional bare convection tracer.

It appears, without being held to theory, that even though the thermal flux is significantly lower for the silicone rubber jacketed convection tracer, the area of contact at each band location provides a much larger conduction area for heat transfer than can be provided at each band location for the bare metal tracer. This apparently offsets the generally higher convection heat flux of the bare metal tracer. Consequently, the conductance performance of the safety convection tracer is about the same or nearly as great as the conductance performance of the bare tracer.

Polymeric jacket 34 thus reduces the risk of and the severity of burn injuries, yet there is no appreciable difference in conductance performance between the safety heat-convection tracer and the bare tracer. This is an unexpected result. It had been assumed that placing a covering of polymeric material over a metal tracer would result in substantially less conduction of heat into the traced pipe. Instead it was found that about the same heat conduction was obtained.

The problem of reducing the frequency of and severity of burn injuries is thus addressed. Safety-enhanced convection tracer 36, which has a thin layer of polymeric material 34 covering the otherwise bare tube 32, provides substantially the same transfer of heat to a process pipe as a bare tube does without a polymeric coating. Yet, safety convection tracer 36 greatly reduces the risk of burn injuries, reducing both the frequency of and severity of burn injuries to people who need to work near and around process pipes and equipment that must be heat traced.

CALCULATION METHOD

When an insulated pipe reaches an equilibrium temperature, the heat loss through the thermal insulation must be equal to the heat delivered by the steam tracer tube.

$Q_{loss}=Q_{delivered}$

Or $C_I(T_P-T_A)=C_T(T_{media}-T_P)$

Where:

$C_I$=heat conductance through the annular air space between the pipe and the oversized insulation the insulation material, the weather barrier and the outside air film (BTU/hr-ft.-° F.) *Insulation is usually oversized to allow space for the tracer tube(s).

$C_T$=heat conductance between the tracer and the pipe (BTU/hr-ft.-° F.)

$T_{media}$=heat transfer media temperature=$T_s$ for steam $T_P$=pipe temperature $T_A$=ambient temperature The ratio of tracer conductance to insulation conductance forms the dimensionless group commonly referred to as R factors.

$$R = \frac{C_T}{C_I} = \frac{T_P - T_A}{T_S - T_P}$$

Heat gain loss through the thermal insulation material is calculated by the use of Thermon Manufacturing Company's Computrace® computer design program which provides results similar to ASTM C-680 - 1989 (reapproved 1995) and ANSI/IEEE 515 - 1989.

The test results showed both the Bare Convection tracer and the BTS tracer to hold the 8-inch pipe at 206° F. The average steam temperature was 358° F. and the average ambient temperature was 76° F. Two-inch thick fiberglass insulation covered the tracer pipe.

$$R = \frac{T_P - T_A}{T_S - T_P} = \frac{206 - 76}{358 - 206} = \frac{130}{152} = 0.855$$

The thermal insulation was oversized to 10-inch preformed pipe size to fit over the 8-inch pipe and tracers.

The insulation heat loss Q was found to be approximately 52.26 BTU/hr-ft. To find the insulation conductance $C_I$ divide Q by the process to ambient temperature difference or, $$C_I = \frac{52.26}{206 - 76} = \frac{52.26}{130}$$

$C_I$=0.402 BTU / hr.–ft.–° F.

$R = C_T/C_I$ $C_T = R \times C_I = 0.855 \times 0.402$ $C_T$=0.344 BTU/hr.–ft.–° F.

The foregoing disclosure and description of the invention are illustrative and explanatory thereof, and various changes in the details of the illustrated apparatus and construction and method of operation may be made without departing from the spirit of the invention.

What is claimed is:

1. A safety-enhanced convection tracer, comprising:
 a bare tube for conveying a hot heat-transfer fluid for providing heat to a process pipe or vessel; and
 a layer of polymeric material covering the bare tube and forming a covered tube, wherein the risk of human burn injury during accidental touch of the covered tube is substantially lower than the risk of human burn injury during accidental touch of the bare tube, and wherein the covered tube is capable of providing a heat transfer rate substantially equivalent to the heat transfer rate of the bare tube.

2. The tracer of claim 1, wherein the layer of polymeric material is an extruded coating, a tape, a wrap, a sleeve, or a deposit.

3. The tracer of claim 2, wherein the layer of polymeric material has a thickness ranging between about 10 mils and about 100 mils.

4. The tracer of claim 3, wherein the polymeric material is a silicone rubber material.

5. The tracer of claim 1, wherein the polymeric material is a thin layer of silicone rubber material having a thickness ranging between about 10 mils and about 100 mils, wherein for a contact time of about 5 seconds or less, a predicted skin contact temperature for the covered tube is less than about 150° F. for a steam temperature of 298° F. at 50 psig whereas the predicted skin contact temperature for a bare tube is greater than about 250° F. for a steam temperature of 298° F. at 50 psig.

6. A safety-enhanced convection tracer having a lower risk of burn injury than a bare metal heat-convection tracer, comprising:

a bare tube having an outside diameter ranging between about ⅛ of an inch and about one inch, the bare tube with a hot heat-transfer fluid being capable of a conductance range of about 0.258 BTU/hr-ft-° F. to about 0.603 BTU/hr-ft-° F. for a ⅜-inch tube size, a conductance range of about 0.343 BTU/hr-ft-° F. to about 0.80 BTU/hr-ft-° F. for a ½-inch tube size, and a conductance range of about 0.517 BTU/hr-ft-° F. to about 1.2 BTU/hr-ft-° F. for a ¾-inch tube size; and a layer of silicone rubber covering the bare tube and forming a covered tube, wherein the conductance performance of the covered tube is about the same as that for the bare tube, wherein the covered tube is adated to provide substantially the same conductance ranges as the bare tube, and wherein a predicted skin contact temperature for the covered tube is substantially less than a predicted skin contact temperature for the bare tube.

7. The tracer of claim 6, wherein the layer of silicone rubber has a thickness ranging between about 10 mils and about 100 mils.

8. The tracer of claim 7, wherein the layer of silicone rubber has a thickness ranging between about 40 mils and about 60 mils.

9. The tracer of claim 6, wherein for a contact time of about 5 seconds or less, the predicted skis contact temperature for the covered tube is less than about 150° F. for a steam temperature of 298° F. at 50 psig whereas the predicted skin contact temnperature for a bare tube is greater than about 250° F. for a steam temperature of 298° F. at 50 psig.

10. A heat convection tracing system adapted to reduce the risk of burn injury while externally heating a process pipe or vessel in order to maintain a process fluid in the pipe or vessel within a specified temperature range, the system comprising:

a bare metallic heat-transfer tube capable of conveying steam;

a thin layer of polymeric material extruded, taped, wrapped, coated, plated or deposited on the tube so as to form a covered tube; and a securement means for attaching the covered tube to the pipe or vessel to obtain a heat transfer conductance rate for the covered tube of 0.258 BTU/hr-ft-° F. to 1.2 BTU/hr-ft-° F. for bare tube sizes ranging between about ⅜-inch O.D. and about ¾-inch O.D., wherein for a contact time of about 5 seconds or less, a predicted skin contact temperature for the covered tube is less than about 150° F. for a steam temperature of 298° F. at 50 psig whereas the predicted skin contact temperature for a bare tube is greater than about 250° F. for a steam temperature of 298° F. at 50 psig.

11. The system of claim 10, wherein the polymeric material is silicone rubber having a safety yellow color.

12. The system of claim 11, wherein the polymeric material is from about 10 to about 100 mils in thickness.

13. The system of claim 12, wherein said securement means is selected from the group consisting of high-temperature plastic, metallic tapes, fibrous tapes, bands, straps, clamps, cords, ropes, springs, strings and wire.

* * * * *